United States Patent
Wu

(10) Patent No.: US 6,298,951 B1
(45) Date of Patent: Oct. 9, 2001

(54) BRAKE ARM PITCH ADJUSTMENT STRUCTURE FOR VEHICLE FRONT BRAKE

(76) Inventor: Hui-E Wu, 2F., No. 44, Lane 11, Fu Hsin North Rd., Taipei (TW)

( * ) Notice: Subject to any disclaimer, the term of this patent is extended or adjusted under 35 U.S.C. 154(b) by 0 days.

(21) Appl. No.: 09/634,574

(22) Filed: Aug. 8, 2000

(30) Foreign Application Priority Data

Jan. 31, 2000 (TW) .............................................. 089201692

(51) Int. Cl.$^7$ ...................................................... B62L 1/02
(52) U.S. Cl. .................................... 188/24.12; 188/24.19; 188/24.22; 188/2 D
(58) Field of Search ............................ 188/24.11, 24.12, 188/24.13, 24.14, 24.15, 24.18, 24.19, 24.22, 2 D

(56) References Cited

U.S. PATENT DOCUMENTS

| | | | |
|---|---|---|---|
| 3,628,635 | * 12/1971 | Yoshigai | ............................ 188/24.26 |
| 4,591,026 | * 5/1986 | Nagano | ................................. 188/2 D |
| 4,718,521 | * 1/1988 | Hosokawa | ......................... 188/24.19 |

FOREIGN PATENT DOCUMENTS

2145484 * 3/1985 (GB) .................. 188/24.12

* cited by examiner

Primary Examiner—Robert J. Oberleitner
Assistant Examiner—Devon Kramer
(74) Attorney, Agent, or Firm—Varndell & Varndell, PLLC

(57) ABSTRACT

A brake arm pitch adjustment structure for vehicle front brake includes a first brake arm and a second brake arm pivoted to a fixed axle, a cable guide fastened to a shaft at a shoulder of the first brake arm to hold a brake cable, enabling the core of the brake cable to be fixed to a core holder at the second brake arm, and a swivel adjustment member turned about the shaft between two positions to adjust the pitch between the brake arms, the swivel adjustment member having two parallel sidewalls pivoted to the shaft, a connecting back wall connected between the sidewalls and a handle upwardly outwardly extended from the connecting back wall, wherein the connecting back wall of the swivel adjustment member has a top side connected between the short top side of each sidewall; the short top side of each sidewall of the swivel adjustment member having a straight engagement portion obliquely backwardly sloping toward the connecting back wall and the handle, and a parabolic guide portion connected between the straight engagement portion and one end of the long front side of the corresponding sidewall; the contained angle defined between the straight engagement portion and the longitudinal central line of the corresponding sidewall is smaller than 90 °.

1 Claim, 7 Drawing Sheets

BRAKE ARM PITCH ADJUSTMENT STRUCTURE FOR VEHICLE FRONT BRAKE

BACKGROUND AND SUMMARY OF THE INVENTION

The present invention relates to a vehicle front brake, and more specifically to a swivel adjustment member for a vehicle front brake for adjusting the pitch between the brake arms of the vehicle front brake, which is durable and practical in use.

FIGS. from 1 through 3 show a vehicle front brake according to the prior art. This structure of vehicle front brake comprises a swivel adjustment member 4 turned about a shaft relative to a cable guide 43 between two positions to adjust the pitch between the brake shoes 441 and 451 at two brake arms 44 and 45. The swivel adjustment member 4 comprises two parallel sidewalls 41, a connecting wall 42 connected wall 42. The sidewalls 41 each have a short side 411 and long side 412 connected at right angles and alternatively forced into engagement with positioning grooves 431 of the cable guide 43. This structure of swivel adjustment member 4 is not satisfactory in function, and has numerous drawbacks as outlined hereinafter.

1. Because the connecting wall 42 is a narrow wall transversely connected between the sidewalls 41 remote front the short side 411 of each sidewall 41, the sidewalls 41 tend to be forced outwards and deformed, causing a positioning failure in the positioning grooves 431 of the cable guide 43.
2. Because the short side 411 defines with the longitudinal central line of the respective sidewall 41 a 90 ° contained angle, the sidewalls 41 tend to be forced away from the positioning grooves 431 of the cable guide 43 by an external force.
3. Because the handle 421 extends from the connecting wall 42 in direction reversed to the long side 412 of each sidewall 41, the handle 421 may hinder the operation of the brake arms 44 and 45 when the short side 411 of each sidewall is respectively engaged into the positioning groove 431 of the cable guide 43.
4. Because the short side 411 defines with the longitudinal central line of the respective sidewall 41 a 90 ° contained angle, it takes much effort to shift the swivel adjustment member 4 between the two positions.

The present invention has been accomplished to provide a swivel adjustment member for a vehicle front brake, which eliminates the aforesaid drawbacks. According to one aspect of the present invention, the swivel adjustment member comprises two parallel sidewalls, a connecting back wall connected between the sidewalls, and a handle extended from the back connecting wall, wherein the connecting back wall of the swivel adjustment member has a top side connected between the short top side of each sidewall to reinforce the structural strength of the swivel adjustment member, and to prevent the sidewalls from being stretched outwards or deformed when forced into engagement with the positioning grooves of the cable guide. According to another aspect of the present invention, the sidewalls each have a short top side and a long front side alternatively forced into engagement with the positioning grooves of the cable guide, and the handle is extended upwardly backwards from the top side of the connecting back wall adjacent to the short top side of each sidewall. After positioning of the swivel adjustment member in either of the two positions, the handle does not hinder the operation of the brake arms. According to another aspect of the present invention, the short top side of each sidewall of the swivel adjustment member has a straight engagement portion obliquely backwardly sloping toward the connecting back wall and the handle, and a parabolic guide portion connected between the straight engagement portion and one end of the long front side of the corresponding sidewall. The parabolic guide portion enables the sidewalls to be smoothly shifted between the two positions. According to still another aspect of the present invention, the contained angle defined between the straight engagement portion and the longitudinal central line of the corresponding sidewall is smaller than 90 °, so that the short top side of each sidewall can be positively respectively positioned in the positioning grooves of the cable guide. According to still another aspect of the present invention, the handle has a fixed and connected to the topside of the connecting back and one end of the straight engagement portion of the short topside of each sidewall. After the short topside of each sidewall of the swivel adjustment member has been respectively forced into engagement with the positioning grooves of the cable guide, the handle is stopped at the periphery of the cable guide to hold the swivel adjustment member in place.

DETAILED DESCRIPTION OF THE PREFERRED EMBODIMENT

Figure 1:
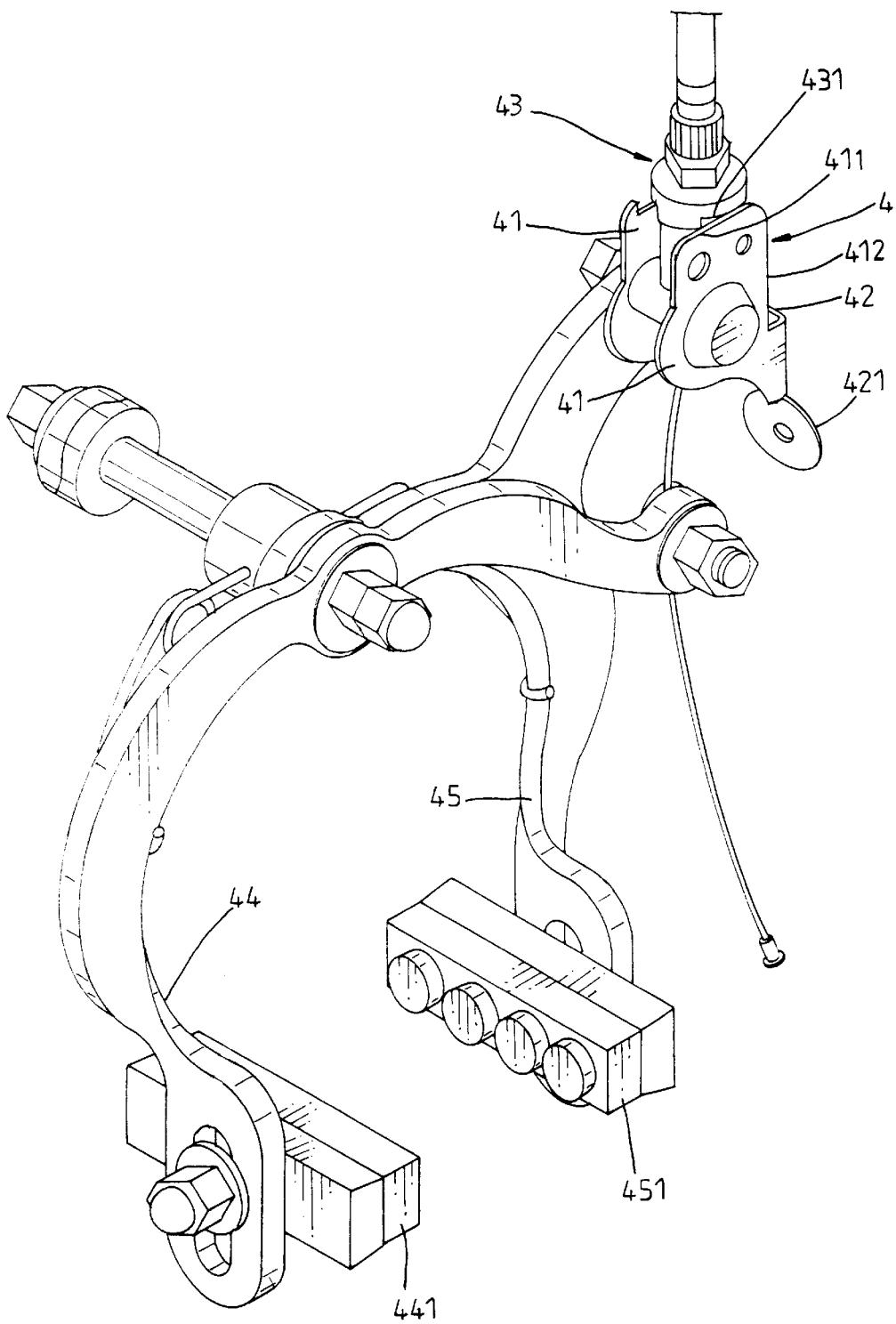
FIG. 1 is a perspective view of a vehicle front brake according to the prior art (the brake lever excluded).
Figure 2:
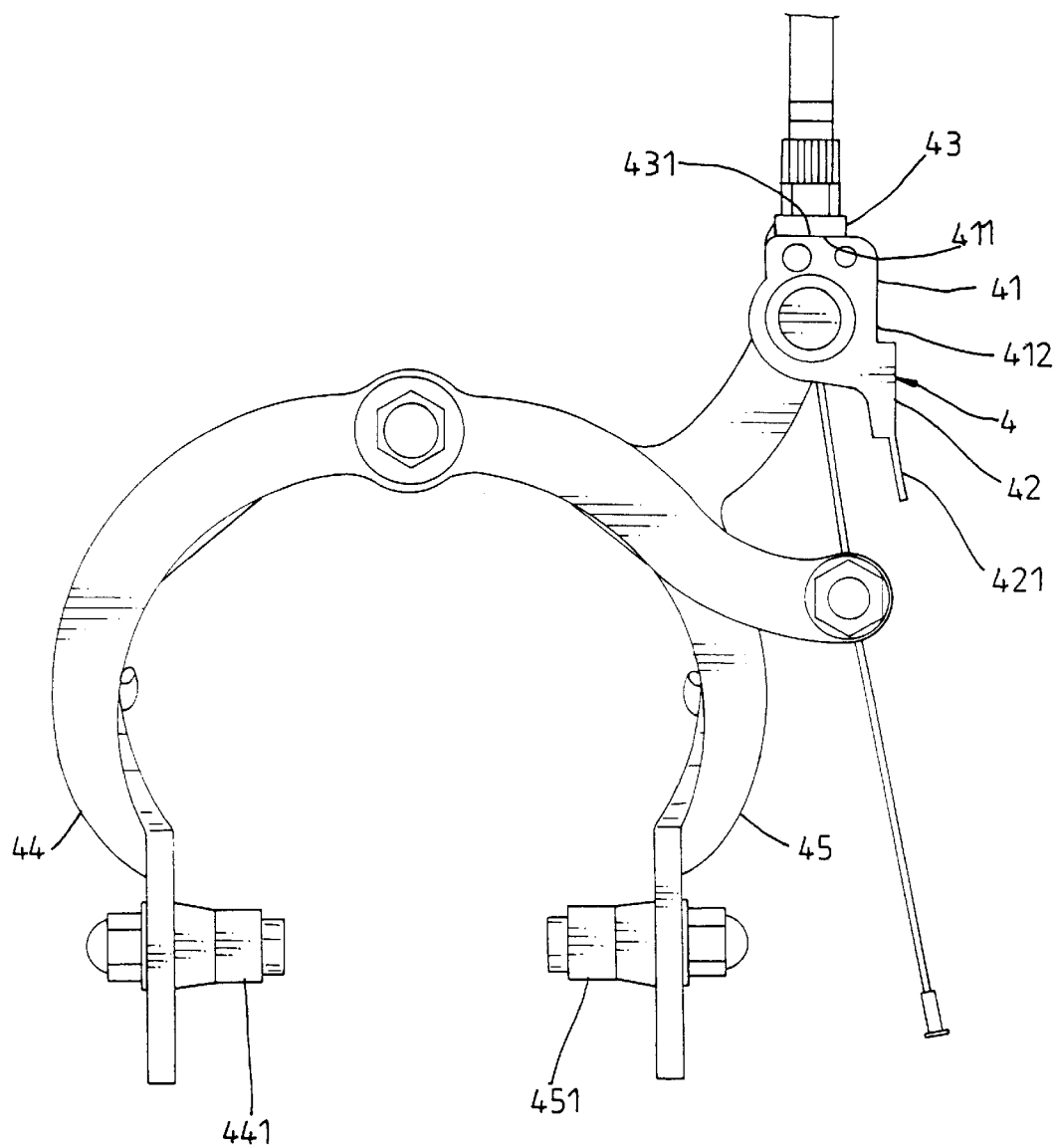
FIG. 2 is a side plain view of FIG. 1.
Figure 3:
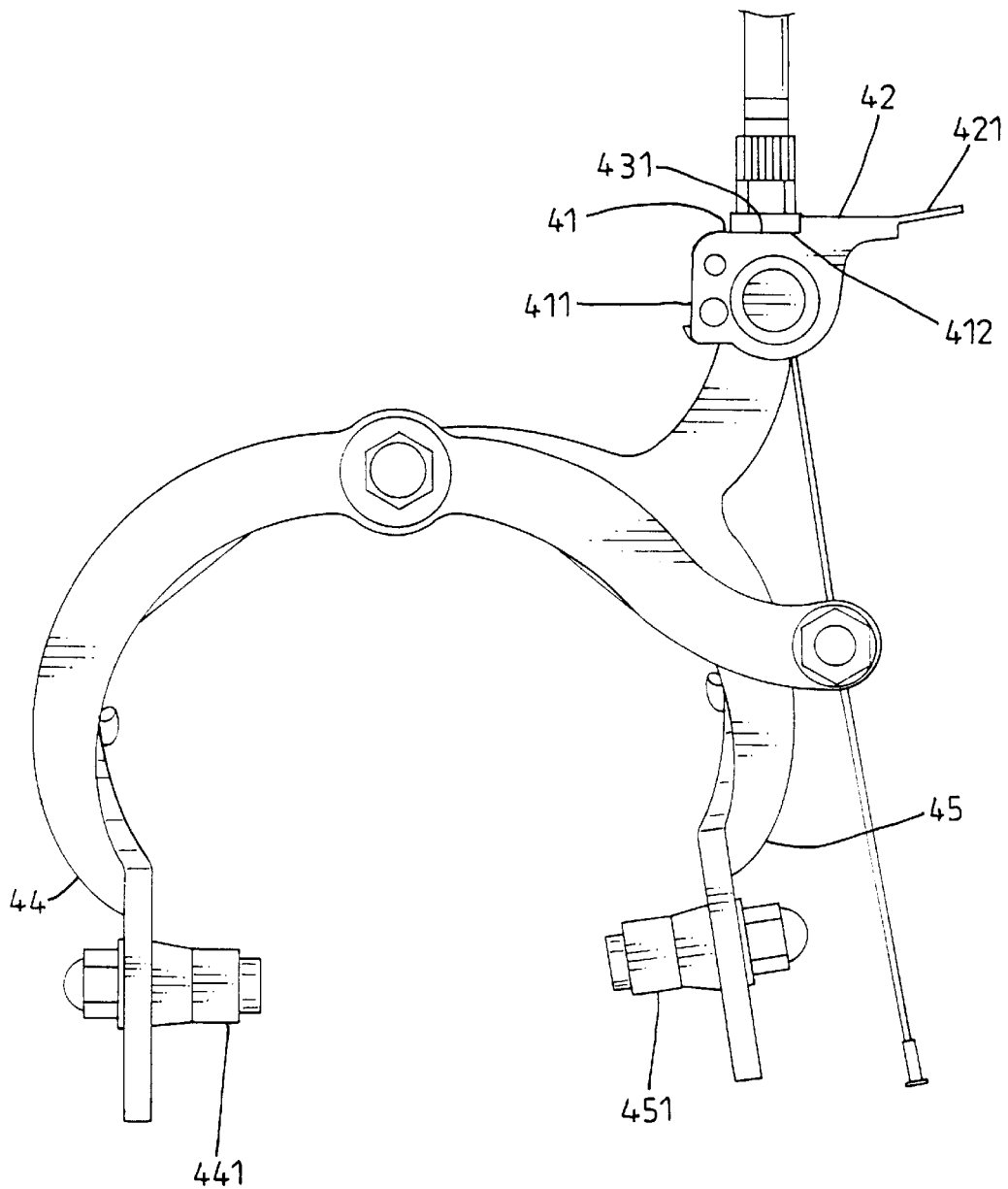
FIG. 3 is similar to FIG. 2 but showing the position of the swivel adjustment member adjusted, the long backside of each sidewall engaged into the positioning grooves of the cable guide.

Referring to FIGS. from 4 through 7, a vehicle front brake comprises a brake cable 1, a brake lever (not shown) installed in the handlebars of a vehicle and adapted for operation by hand to pull the core 11 of the brake cable 1, a fixed axle 29 fixedly mounted on the frame of the vehicle adjacent to the front wheel of the vehicle, a first brake arm 2 and a second brake arm 3 respectively pivoted to the fixed axle 29 and secured thereto by a lock nut 40, the brake arms 2 and 3 each having an elongated mounting hole 21 or 31 disposed at the respective bottom end, two brake shoes 61 and 62 respectively mounted in the mounting holes 21 and 31 of the brake arms 2 and 3 and fixedly secured thereto at the desired elevation by respective lock nuts 20 and 30, a torsional spring 5 mounted on the fixed axle 29, the torsional spring 5 having two opposite ends 51 and 52 respectively fastened to the brake arms 2 and 3 to push the brake arms 2 and 3 apart, a shaft 70 fastened to a shoulder 22 of the first brake arm 2, the shaft 70 having a transverse mounting hole 701, a swivel adjustment member 9 pivoted to the shaft 70, a headed, tubular cable guide 7 mounted in the transverse mounting hole 701 of the shaft 70 to hold the brake cable 1, a core holder 8 fastened to one end of the second brake arm 3 by a lock nut 10 to hold one end of the core 11 of the brake cable 1. When loosening the lock nut 10, the core 11 can then be moved axially relative to the core holder 8.

The core 11 of the brake cable 1 is inserted through the cable guide 7, which is fastened to the shaft 70 at the shoulder 22 of the first brake arm 2, and connected between the brake lever and the core holder 8 at the second brake arm 3. When depressing the brake lever, the core 11 is pulled, causing the brake arms 2 and 3 to be turned about the fixed axle 29 toward each other. The swivel adjustment member 9 is eccentrically pivoted to the shaft 70, having two parallel sidewalls 91 respectively pivoted to the shaft 70, a connecting back wall 90 connected between the parallel sidewalls 9 and spaced from the periphery of the shaft 70 at one side, and a handle 901 extended from the connecting back wall 90. The parallel sidewalls 91 each have a short topside 911 and long front side 912 extended downwards from one end of the short topside 911. The cable guide 7 has two positioning grooves 71 bilaterally disposed at the bottom sidewall of the head thereof. The swivel adjustment member 9 can be turned about the shaft 70 between the two positions to adjust the tension of the core 11 of the brake cable 1 and the distance between the brake shoes 61 and 62, namely, the first position where the short topside 911 of each sidewall 91 is respectively forced into engagement with the positioning grooves 71 of the cable guide 7, and a second position where the long front side 912 of each sidewall 91 of the swivel adjustment member 9 is respectively forced into engagement with the positioning grooves 71 of the cable guide 7. When turning the swivel adjustment member 9 to the first position, the distance between the brake shoes 61 and 62 is relatively shortened. On the contrary, when turning the swivel adjustments member 9 to the second position, the distance between the brake shoes 61 and 62 is relatively increased.

Figure 4:
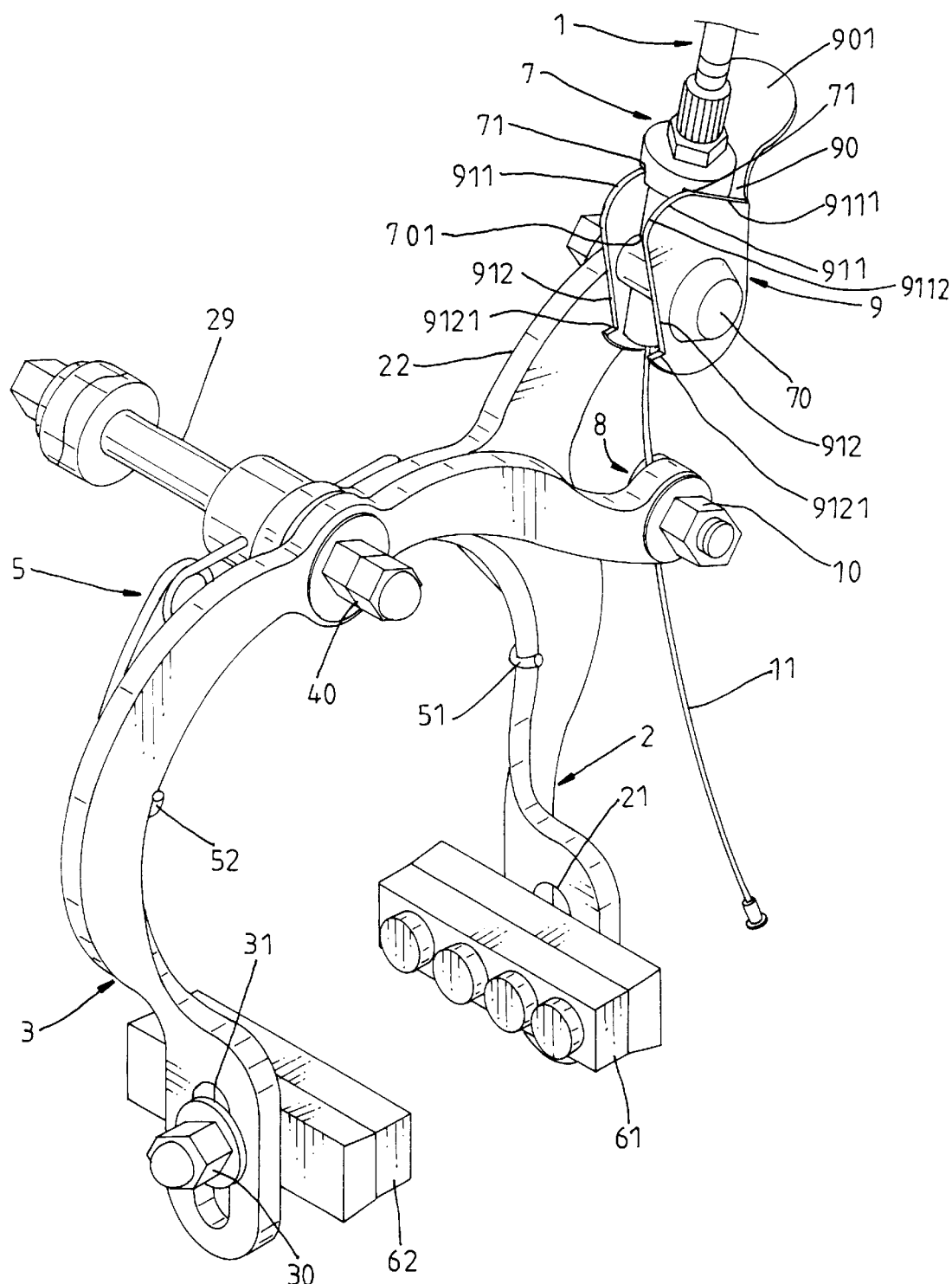
FIG. 4 is a perspective view of a vehicle front brake according to the present invention (the brake lever excluded).
Figure 5:
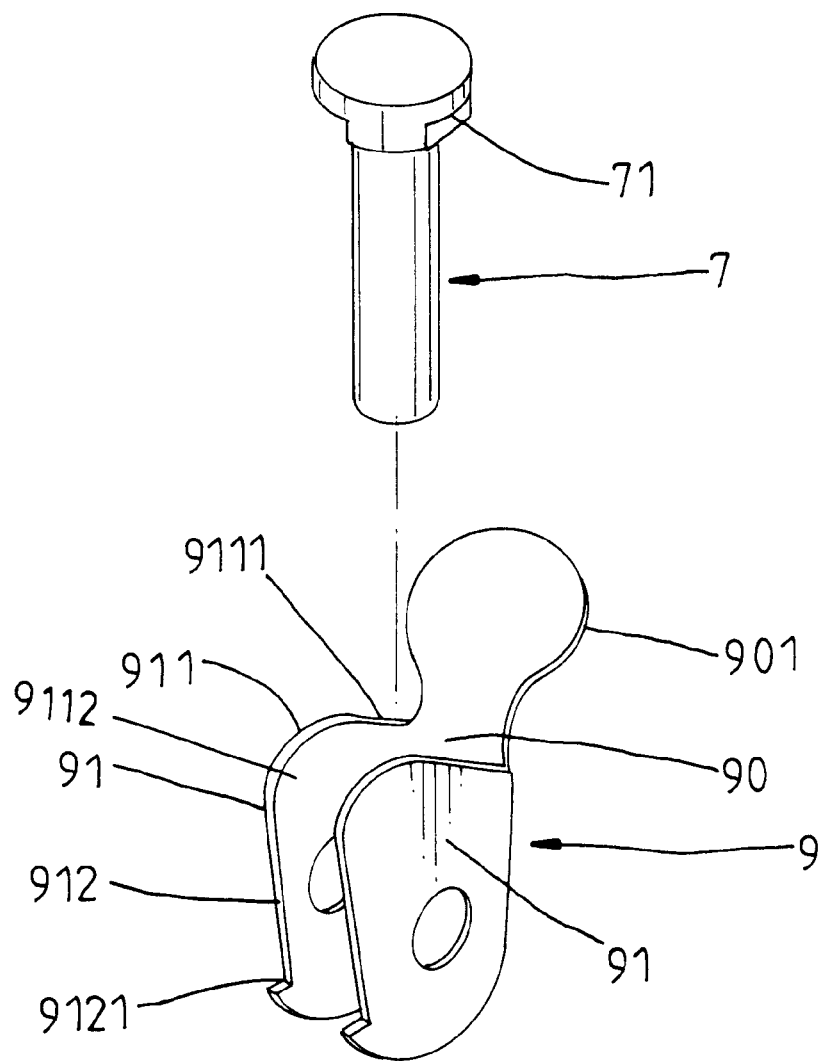
FIG. 5 is an exploded view of the cable guide and the swivel adjustment member for the vehicle front brake according to the present invention.
Figure 6:
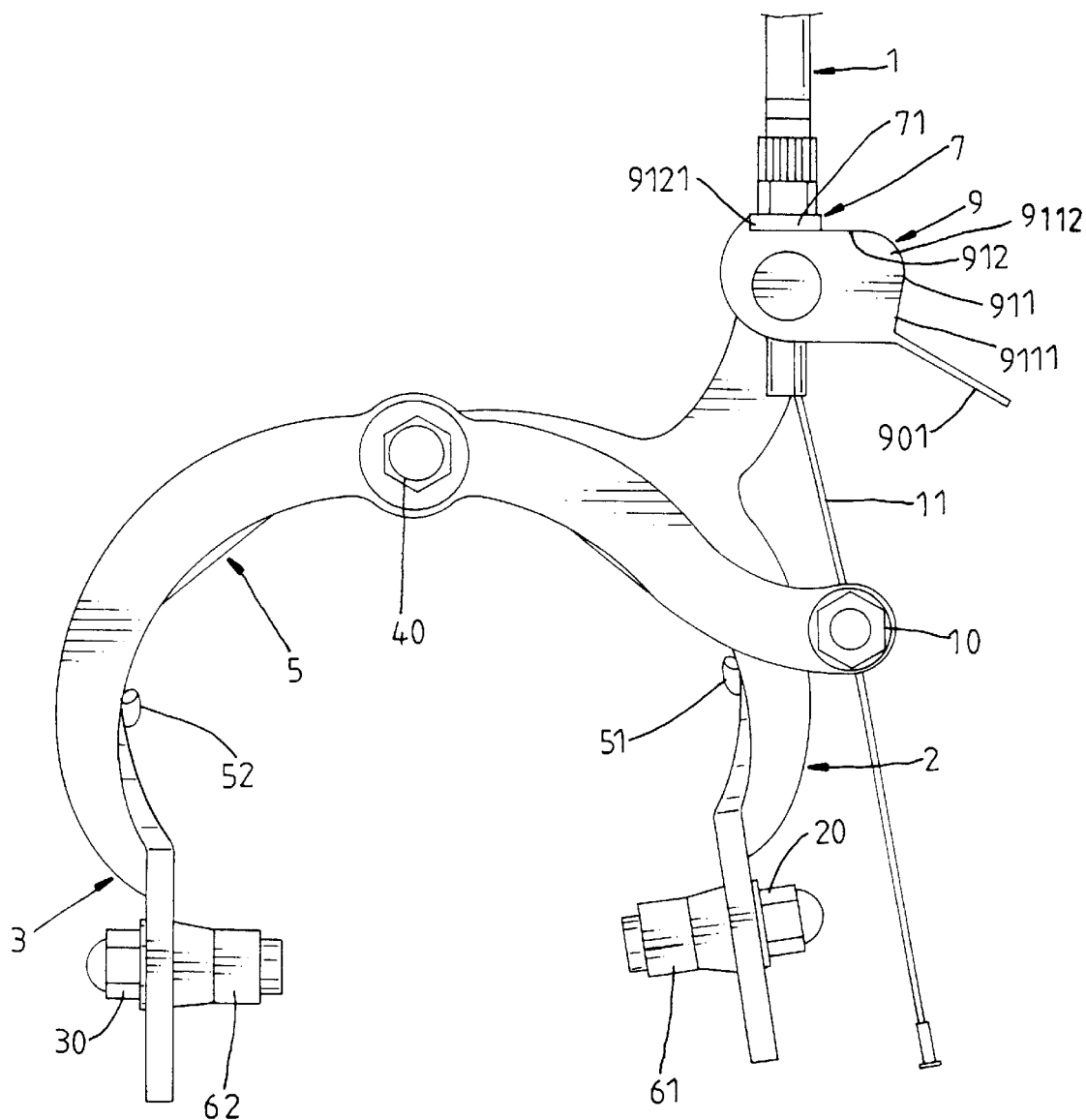
FIG. 6 is a side plain view of the present invention, showing the long front side of each sidewall of the swivel adjustment member respectively engaged into the positioning grooves of the cable guide.
Figure 7:
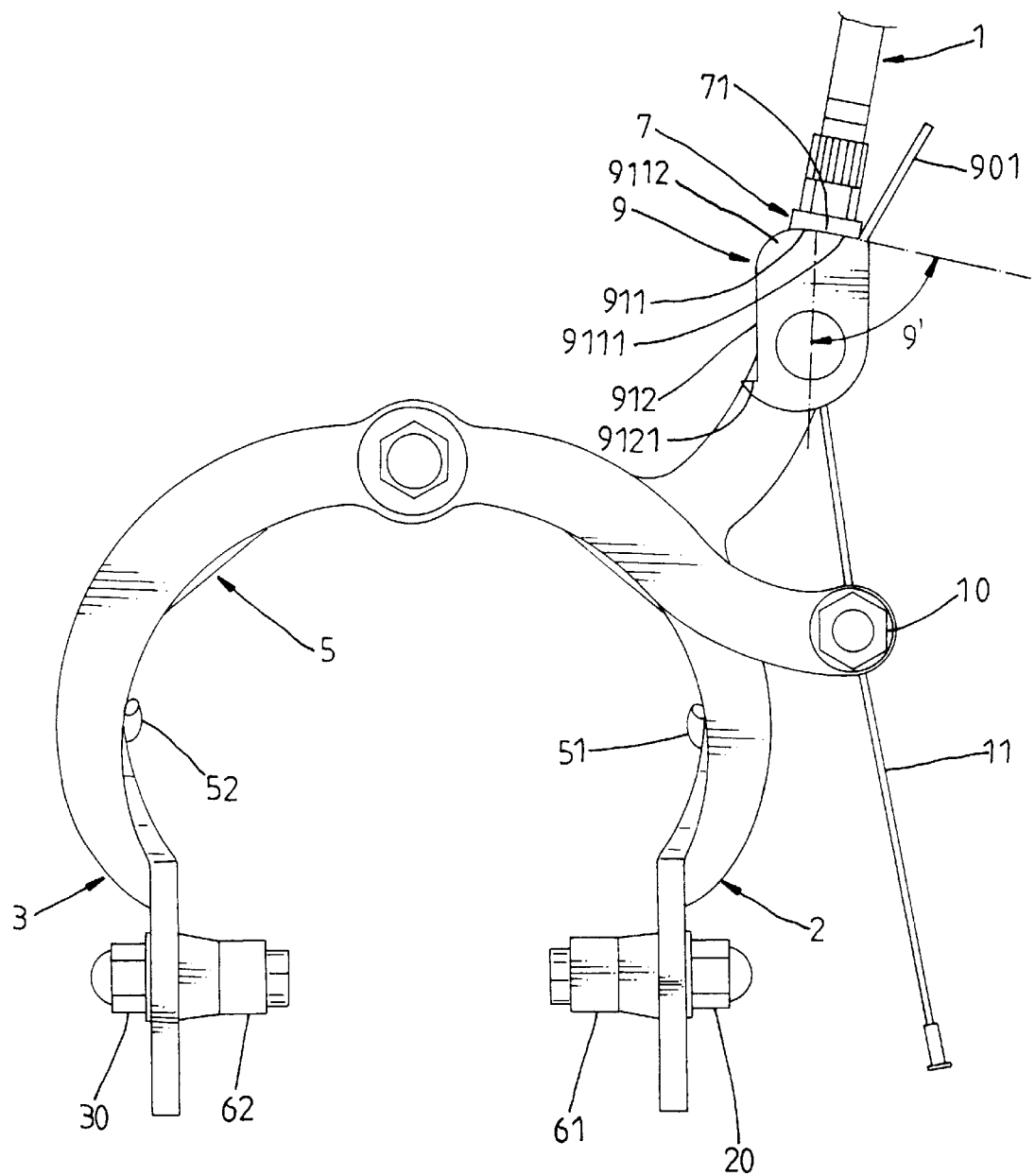
FIG. 7 is another side plain view of the present invention, showing the short topside of each sidewall of the swivel adjustment member respectively engaged into the positioning grooves of the cable guide.

The main characteristics of the present invention are described hereinafter. The connecting back wall 90 of the swivel adjustment member 9 has a topside connected between the short topside 911 of each of the parallel sidewalls 91. The handle 901 is extended from the topside of the connecting back wall 90 adjacent to the short topside 911 of each sidewall 91. When turning the swivel adjustment member 9 about the shaft 70 to the first position, the handle 901 is disposed adjacent to the positioning grooves 71 of the cable guide 7. This handle position design enables the swivel adjustment member 9 to be conveniently efficiently turned about the shaft 70 between the first position and the second position without causing an outward stretching force to force the sidewalls 91 outwards in reversed directions, and preventing the handle 901 from being touched by the brake arms 2 and 3 during operation. The short topside 911 of each sidewall 91 of the swivel adjustment member 9 comprises a straight engagement portion 9111 obliquely backwardly sloping toward the connecting back wall 90 and and handle 901, and a parabolic guide portion 9112 connected between the straight engagement portion 9111 and one end of the corresponding long front side 912. The contained angle 9' defined between the straight engagement portion 9111 and the longitudinal central line of the respective sidewall 91 is smaller than 90 ° (see FIG. 7). The design of the straight engagement portion 9111 of the short topside 911 of each sidewall 91 of the swivel adjustment member 9 enables the short top side 911 of each sidewall 91 of the swivel adjustment member 9 to be positively engaged in the positioning grooves 71 of the cable guide 7. The design of the parabolic guide portion 9112 of the short topside 911 of each sidewall 91 of the swivel adjustment member 9 enables the swivel adjustment member 9 to be smoothly shifted between the first position and the second position. The straight engagement portion 9111 of the short topside 911 has a front end connected to the parabolic guide portion 9112, and a rear end integral with the connecting back wall 90 and the handle 901. When turning the swivel adjustment member 9 about the shaft 70 to the first position to force the short top side 911 of each sidewall 91 into engagement with the positioning grooves 71 of the cable guide 7, the handle 901 is stopped at the periphery of the head of the cable guide 7, and therefore the swivel adjustment member 9 is positively held in the first position. Further, the long front side 912 of each sidewall 91 of the swivel adjustment member 9 has a top end connected to the parabolic guide portion 9112, and a bottom end terminating in a hooked portion 9121. When turning the swivel adjustment member 9 about the shaft 70 from the first position shown in FIG. 4 to the second position shown in FIG. 6, the long front side 912 of each sidewall 91 is respectively engaged into the positioning grooves 71 of the cable guide 7, and the hooked portion 9121 of the long front side 912 of each sidewall 91 is respectively hooked on the periphery of the head of the cable guide 7.

What is claimed is:

1. A brake arm pitch adjustment structure for vehicle front brake comprising a brake cable, said brake cable having a core, a brake lever installed in the handlebars of a vehicle and adapted for operation by hand to pull the core of said brake cable, a fixed axle fixedly mounted on the frame of the vehicle adjacent to the front wheel of the vehicle, a first brake arm and a second brake arm respectively pivoted to said fixed axle and secured thereto by a lock nut, said first brake arm having a shoulder, two brake shoes respectively mounted on said brake arms, a torsional spring mounted on said fixed axle, said torsional spring having two opposite ends respectively fastened to said brake arms to push said brake arms apart, a shaft fastened to the shoulder of said first brake arm, said shaft having a transverse mounting hole, a swivel adjustment member pivoted to said shaft, a headed, tubular cable guide mounted in the transverse mounting hole of said shaft to hold said brake cable in place, said cable guide comprising two positioning grooves bilaterally disposed at a bottom sidewall of a head thereof, a core holder fastened to one end of said second brake arm by a lock nut to hold one end of the core of said brake cable, the core of said brake cable being inserted through said cable guide and connected between the brake lever of the bicycle and said core holder, a swivel adjustment member eccentrically pivoted to said shaft and turned about said shaft between a first position and a second position to adjust the pitch between said first brake arm and said second brake arm, said swivel adjustment member comprising two parallel sidewalls respectively pivoted to said shaft, a connecting back wall connected between said parallel sidewalls and spaced from the periphery of said shaft at one side, and a handle extended from said connecting back wall, said parallel sidewalls each having a short top side, which is forced into engagement with the positioning grooves of said cable guide when said swivel adjustment member is turned to said first position, and a long front side extended downwards from one end of said short top side, which is forced into engagement with the positioning grooves of said cable guide when said swivel adjustment member is turned to said second position, wherein said connecting back wall of said swivel adjustment member has a top side connected between the short top side of each of said parallel sidewalls; and handle is extended from the top side of said connecting back wall adjacent to said short top side of each of said parallel sidewalls; the short top side of each of said parallel sidewalls of said swivel adjustment member comprising a straight engagement portion obliquely backwardly sloping toward said connecting back wall and said handle, and a parabolic guide portion connected between said straight engagement portion and one end of the long front side of the corresponding sidewall of said swivel adjustment member, the contained angle defined between said straight engagement portion and the longitudinal central line of the respective sidewall of said swivel adjustment member is smaller than 90 °.

* * * * *